United States Patent
Mullins et al.

(10) Patent No.: US 11,588,635 B2
(45) Date of Patent: *Feb. 21, 2023

(54) STRONG RESOURCE IDENTITY IN A CLOUD HOSTED SYSTEM

(71) Applicant: Microsoft Technology Licensing, LLC, Redmond, WA (US)

(72) Inventors: Christopher L. Mullins, Redmond, WA (US); Robert Standefer, III, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,291

(22) Filed: Sep. 11, 2020

(65) Prior Publication Data

US 2021/0006403 A1     Jan. 7, 2021

Related U.S. Application Data

(63) Continuation of application No. 15/400,637, filed on Jan. 6, 2017, now Pat. No. 10,805,080.

(51) Int. Cl.
*H04L 9/30* (2006.01)
*H04L 9/08* (2006.01)
(Continued)

(52) U.S. Cl.
CPC ............ *H04L 9/30* (2013.01); *G06F 21/6218* (2013.01); *H04L 9/08* (2013.01); *H04L 9/0825* (2013.01);
(Continued)

(58) Field of Classification Search
CPC . H04L 9/30; H04L 9/08; H04L 9/0825; H04L 9/0894; H04L 9/3247; H04L 9/3268; H04L 2209/24; G06F 21/6218
See application file for complete search history.

(56) References Cited

U.S. PATENT DOCUMENTS

| 6,775,382 B1 * | 8/2004 | Al-Salqan ............. H04L 9/0894 |
| | | 380/280 |
| 2002/0013897 A1 * | 1/2002 | McTernan .......... H04N 21/2343 |
| | | 713/153 |

(Continued)

FOREIGN PATENT DOCUMENTS

| CN | 1505309 A | 6/2004 |
| CN | 102483792 A | 5/2012 |

OTHER PUBLICATIONS

"Office Action Issued in Indian Patent Application No. 201947028539", dated Sep. 24, 2021, 7 Pages.
(Continued)

*Primary Examiner* — Trong H Nguyen

(57) ABSTRACT

Aspects of the present disclosure relate to systems and methods for providing strong resource identification. When a resource is created, saved, or re-based, a cryptographic key pair may be generated and associated with the resource. A public key of the cryptographic key pair may be used as a unique identifier. Information about the resource, such as the name of the resource and its actual location may be stored in an index based upon the resource's public key. Sharing the resource with other devices may comprise sending the resource's key, as opposed to information about the resource's actual location, to one or more recipient device.

13 Claims, 14 Drawing Sheets

(51) Int. Cl.
  *H04L 9/32* (2006.01)
  *G06F 21/62* (2013.01)
(52) U.S. Cl.
  CPC .......... *H04L 9/0894* (2013.01); *H04L 9/3247* (2013.01); *H04L 9/3268* (2013.01); *H04L 2209/24* (2013.01)

(56) References Cited

U.S. PATENT DOCUMENTS

| | | | | |
|---|---|---|---|---|
| 2002/0026575 | A1* | 2/2002 | Wheeler | H04L 63/0823 713/156 |
| 2003/0014372 | A1* | 1/2003 | Wheeler | H04L 63/0823 705/71 |
| 2004/0030901 | A1* | 2/2004 | Wheeler | H04L 9/3247 713/176 |
| 2005/0081037 | A1* | 4/2005 | Kumagai | H04L 9/007 713/175 |
| 2006/0010323 | A1* | 1/2006 | Martin | H04L 63/101 713/171 |
| 2011/0179286 | A1* | 7/2011 | Spalka | G06F 21/6254 713/189 |
| 2013/0163754 | A1* | 6/2013 | Ogawa | G06F 21/10 380/44 |
| 2014/0156677 | A1* | 6/2014 | Collins, III | G06F 3/0488 707/748 |
| 2016/0357537 | A1* | 12/2016 | Falkenburg | H04L 67/06 |
| 2019/0238550 | A1* | 8/2019 | Zhang | H04L 67/1046 |

OTHER PUBLICATIONS

"Office Action Issued in Chinese Patent Application No. 201880006012.1", dated Sep. 2, 2022, 12 Pages.

Mazieres, David, "Self-certifying File System", In Thesis Submitted to the Department of Electrical Engineering, Oct. 23, 2000, 141 Pages.

* cited by examiner

Query: http://.../set1/task123?$expand=taskOn($expand=attachmentOn)

Query: http://.../set1/task123?$expand=taskOn($expand=attachmentOn($filter=Subject eq 'Sets'))

STRONG RESOURCE IDENTITY IN A CLOUD HOSTED SYSTEM

CROSS-REFERENCE TO RELATED APPLICATIONS

This application is a continuation of U.S. patent application Ser. No. 15/400,637, filed on Jan. 6, 2017, which application is incorporated herein by reference in its entirety.

BACKGROUND

Conventional identification systems assign an identifier to a resource. Typically, a resource identifier takes the form of an alphanumeric name or a numeric identifier. Identifications systems were originally developed to identify resources stored on individual computers which, at the time, were not capable of storing massive amounts of data. Furthermore, standard identification systems came into being at a time before most devices were interconnected via large networks, such as the Internet. As such, simple naming conventions were sufficient to identify the limited number of resources stored on a device.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to systems and methods for providing strong resource identification. When a resource is created or saved, a cryptographic key pair may be generated and associated with the resource. A public key of the cryptographic key pair may be used as a unique identifier. Information about the resource, such as the name of the resource and its storage location may be stored in an index based upon the resource's public key. Sharing the resource with other devices may comprise sending the resource's key, as opposed to information about the resource's storage location, such as a URL, to one or more recipient device. When accessing the resource, a request may be generated that includes the resource's public key. The resource host may use the public key to lookup storage information about the resource from the index. Using the storage information, the resource may be retrieved and provide to the requestor.

Additionally, the aspects disclosed herein allow for trust and verification operations to be performed using the strong identifier The cryptographic key pair generated as an identifier for a resource allow for the creation of certificates and/or digital signatures that may be associated with the resource that may be used by a requestor to verify a resource upon receipt.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
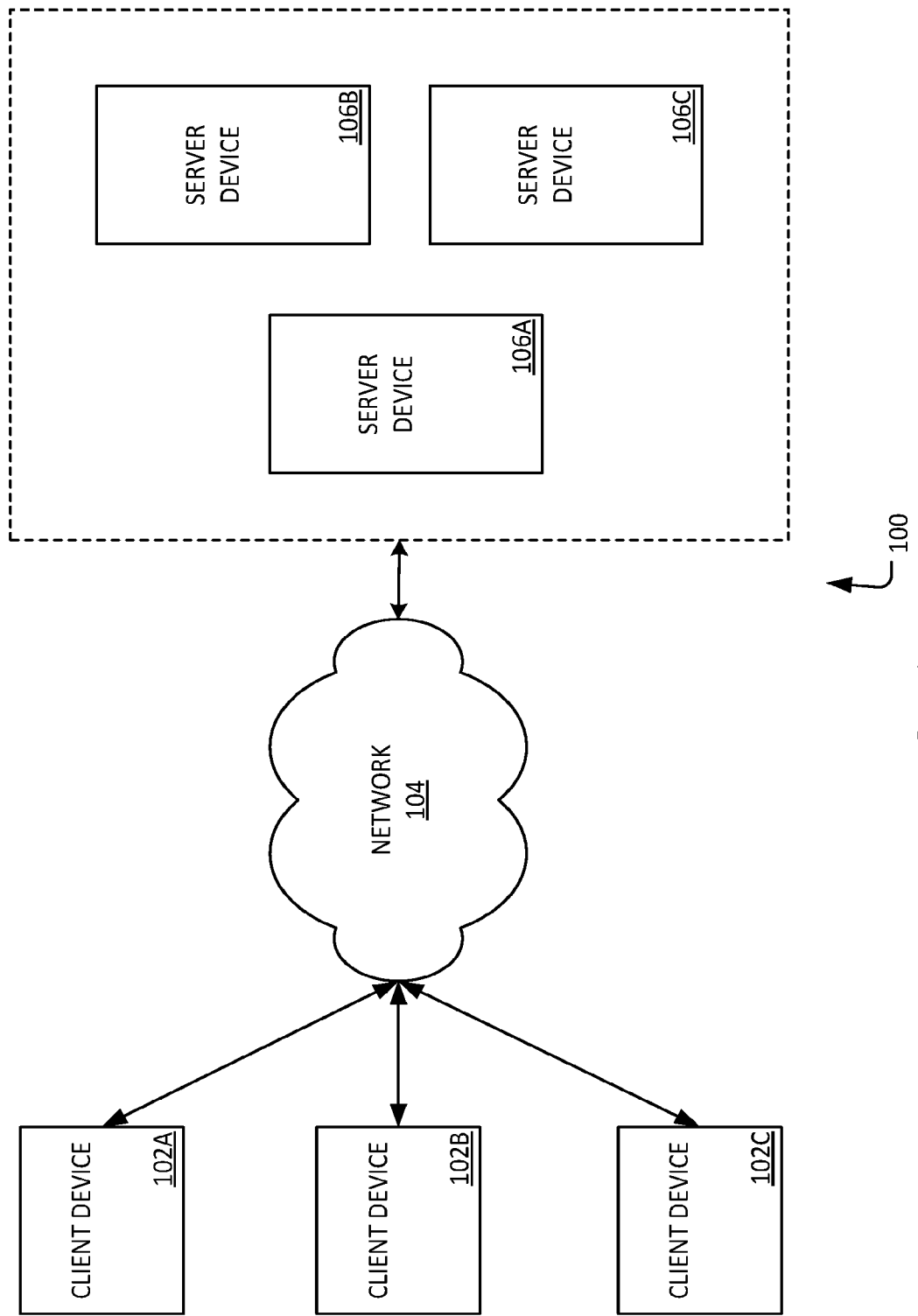
FIG. 1 illustrates an overview of an example system capable of utilizing strong resource identification.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Aspects of the present disclosure relate to providing a strong identity for resources in order to aid in resource discovery, that is, enabling requestors to find and access a resource on a computing system or network. Similarly, the strong identifiers disclosed herein may be used to confirm ma resource's genuineness, that is, that the resource retrieved really is the desired resource. The strong identifier aspects disclosed herein may be applied to any type of resource such as, for example, a file, an application, a web page, an electronic document, a spreadsheet, an image, a video, an audio file, or any other type of data structure created and maintained by a computing system. Rather than using conventional identifiers, cryptographic keys are used to identify a resource. As such, a resource may be shared by sharing a public key associated with the resource with a desired recipient. In some aspects, rather than sending the public key itself, a representation of the public key such as hash/thumbprint/other shorthand form of the public key may be used.

Conventional identification systems assign an identifier to a resource. Typically, a resource identifier takes the form of an alphanumeric name or a numeric identifier. Identifications systems were originally developed to identify resources stored on individual computers which, at the time, were not capable of storing massive amounts of data. Furthermore, standard identification systems came into being at a time before most devices were interconnected via large networks, such as the Internet. As such, simple naming conventions were sufficient to identify the limited number of resources stored on a device. However, in large networked environments, such as a cloud hosted system, simple naming conventions make it difficult for a requestor (e.g., an application or a user) to easily discover a resource. As an example, searching for a resource by an alphanumeric or numeric identifier is difficult in a large system due to the fact that many resources may share the same identifier. For example, there could be hundreds of documents sharing a similar name (e.g., "Work.docx") across a distributed network.

Various solutions have been provided to address the disambiguation issues such as providing a file path to a resource of the use of a Uniform Resource Locator (URL). In conventional systems, when a resource is shared with a recipient, the file path or a link to the resource is provided to the recipient. The recipient is then able to access the resource via the link or by navigating to the resource using the file path information. However, file paths and links have many disadvantages in that they are not durable, they are fragile (e.g., they tend to easily brake), and they are constraining (e.g., once they are distributed the resource cannot me moved or change names). For instance, if a resource is relocated or renamed, the resource is no longer discoverable using a previously generated file path or URL. Thus, the owner of a resource must generate and share new file path information or URLs every time a change is made to the resource in order to allow others to discover the resource. Because of this, a recipient of a resource is often unable to access the resource at a later time using a previously shared URL.

Aspects of the present disclosure address these shortcomings by through the use of cryptographic keys. When a resource is created, saved, or re-based (e.g., after a certification has been compromised or expires), a cryptographic key pair may be generated for the resource. A cryptographic key may be a symmetric key or an asymmetric key pair comprised of a public key and a private key, among other key types. In one example, the public key may be used for encryption and signature verification, while the private key may be used for decryption and signature generation. In another example, the private key may be stored at a location or with access controls other than that of the public key, such that the private key is less widely-available than the public key. A variety of cryptographic algorithms may be used, including, but not limited to, Advanced Encryption Standard (AES), Digital Signature Algorithm (DSA), Rivest-Shamir-Adleman (RSA), and Elliptic Curve Cryptography (ECC), among others, or any combination thereof.

In examples, the public key of the cryptographic key pair may be associated with the resource and used as the resource's identifier. The public key may then be stored in a well-known location where it may be later accessed by resource's host system or owner. The private key associated with the resource may be stored by the resource's host system and/or the resource's owner. When the resource is shared, the public key of the resource is sent to the recipient as opposed to a traditional link or traditional URL for the recipient. Unlike a traditional link or traditional URL, the public key is durable in the sense that changes to the resource or the resource location will not "break" the public key. The public key may be used to access the resource. More specifically, when requesting a resource, a requestor provides the resource's public key for the resource. Because the resource is identified by its public key, a device hosting the resource can identify the resource using the public key and provide the resource to the requestor at which point the requestor may validate that the requested resource is correct via the public/private key infrastructure. However, the use of public keys for identification may be applied to strengthen traditional URLs or links. For example, a link may be provided that includes a public key, such as, for example, "urn://publicKey=12345abcde" or "secureDoc://docresolver.com/12345abcde." As such, the strong identity aspects disclosed herein may be leveraged to strengthen the use of existing URL, URI, and URN identifiers.

Aspects disclosed herein may be used to identify a number of different types of resources. For example, a strong identifier may be used to identify electronic documents. A word processing document may retrieve and load documents using the strong identifier. In an alternate example, the strong identifier aspects disclosed herein may be used to identify a web page. In such examples, web pages may be retrieved using a resource index as opposed to a traditional DNS server. In yet another aspect, applications stored in an online marketplace may be identified using the strong identifier aspects disclosed herein. For example, a requestor may submit a public key which identifies a particular application to an application marketplace in order to retrieve a desired application. This may be particularly helpful to disambiguate applications stored in an online marketplace as many different applications tend to have the same or similar names.

In addition to addressing the shortcomings of traditional resource identifiers, aspects of the present disclosure provide additional features that are not available using conventional identifiers. In one aspect, the strong resource identifiers provided herein allow for trust determinations to be made about a resource. For example, in a node sharing system, such as an isolated collection, the cryptographic keys associated with the resource may be utilized to declare which resources can be trusted. For example, rules may be applied to resources stored in an isolated collection such that only resources with strong identifiers may be shared. This allows a system to monitor and enforce the provenance of data in a network by tracking information about each resource in the isolated collection. As such, data in a compound resource, such as, for example, a compound document that incorporates portions of other documents, may be tracked to identify who created and owns the individual components of the compound resource. Among other mechanisms, this may be enforced by creating a certificate for each resource using the resource's cryptographic keys. A trust determination may be made by evaluating the certificate associated with each resource.

Aspects of the present disclosure may also be leveraged to perform resource verification. For example, a digital signature may be created for a particular resource using the resource's private key. This provides the ability to verify ownership and or authorship of a resource which may be exposed to a requestor. As such, in addition to using a public key to request a resource, the requestor may also use the resources public key to verify the resource's signature and ensure that the resource provided in response to the request is indeed the requested resource. As such, among other benefits, the strong resource identifiers disclosed herein may be utilized to prevent man-in-the-middle and homographic attacks. Conventional identification systems are not capable of providing the enhanced security features of the strong identifiers disclosed herein.

FIG. 1 illustrates an overview of an example system utilizing strong resource identification. Example system 100 may be a combination of interdependent components that interact to form an integrated whole for performing delegated authentication. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 10-13. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more server devices 106A-C and are accessible by the client devices 102A-C. In some examples, however, the datasets may be at least partially stored on one or more of the client devices 102A-C. The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources using strong resource identification. For example, server device 102A may be a web server, server device 102B may be a device comprising a collaborative messaging tool and a calendaring application, and server device 102C may be electronic mail server. Each of these devices may comprise a repository of resources that is accessible via one or more authentication mechanisms. In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
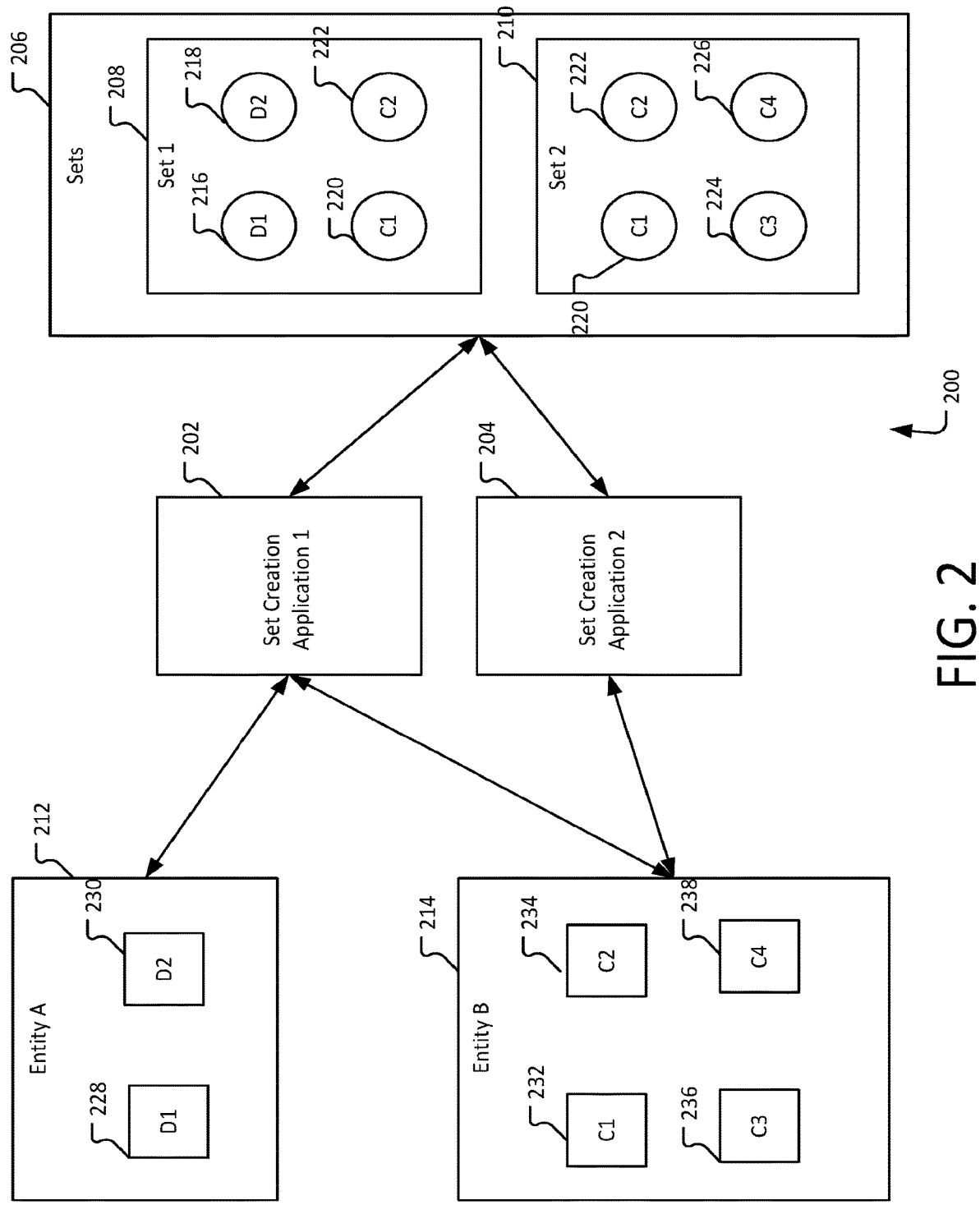
FIG. 2 illustrates an overview of an example system for managing isolated collections of resource identifiers and corresponding relationships.

FIG. 2 illustrates an overview of an example system 200 for managing isolated collections of resource identifiers and corresponding relationships. The isolated collection techniques implemented in system 200 may comprise or be associated with one or more of the delegated authentication techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, files, tasks, mail, documents, calendar events, etc.) and executing queries on those collections. Set creation applications 202 and 204 may further provide for defining and storing rulesets used to infer one or more relationships in the collections, and displaying graphical representations of the collection data. The defined rulesets may be stored in the Set itself, and in some examples is stored as metadata within the Set. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be collocated with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rulesets. The isolated collections may be represented using graphical structures that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238. In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
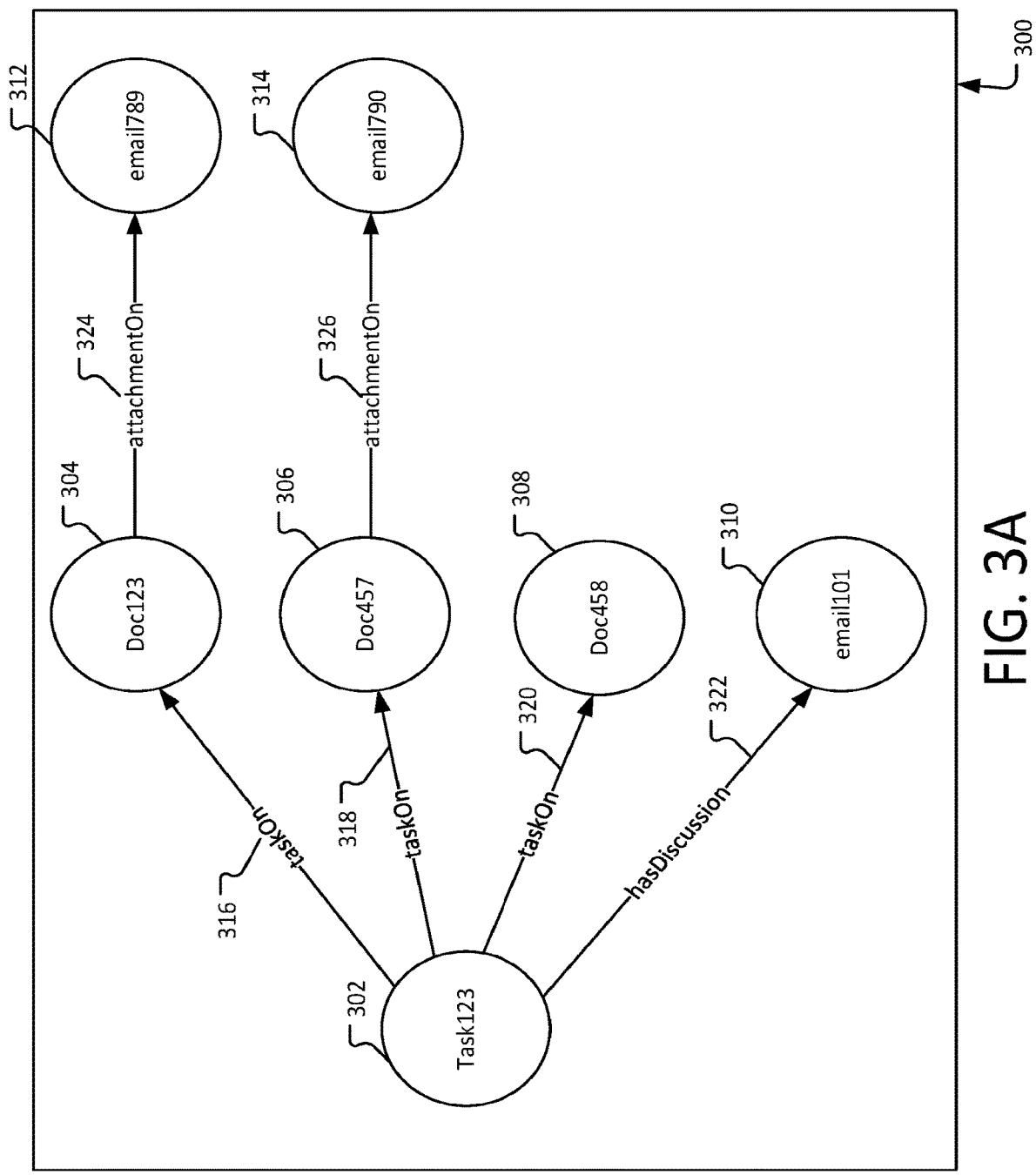
FIG. 3A illustrates an overview of an example isolated collection.

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with semantic web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application. For instance, a developer may manually add each of the resource identifiers and the relationships between the resource identifiers. As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationships, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below.

Isolated collection 300 further depicts that resource identifier 302 is associated with resource identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308. In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail 101. While specific types of resources and relationships are described in FIG. 3A, one of skill in the art will appreciate that other types of resources and/or relationships may be included in an isolated collection without departing from the spirit of this disclosure.

Figure 3C:
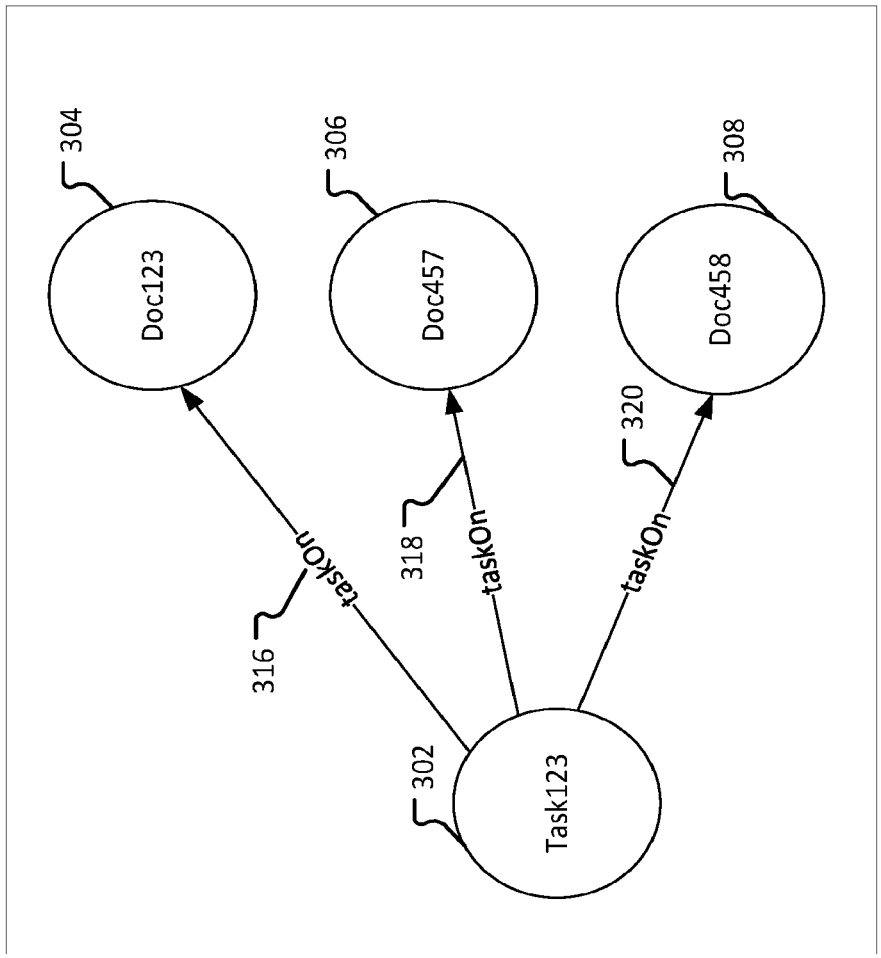
FIGS. 3B-3E illustrate an example query model that may be used to traverse an isolated collection.
Figure 3B:
Figure 3D:
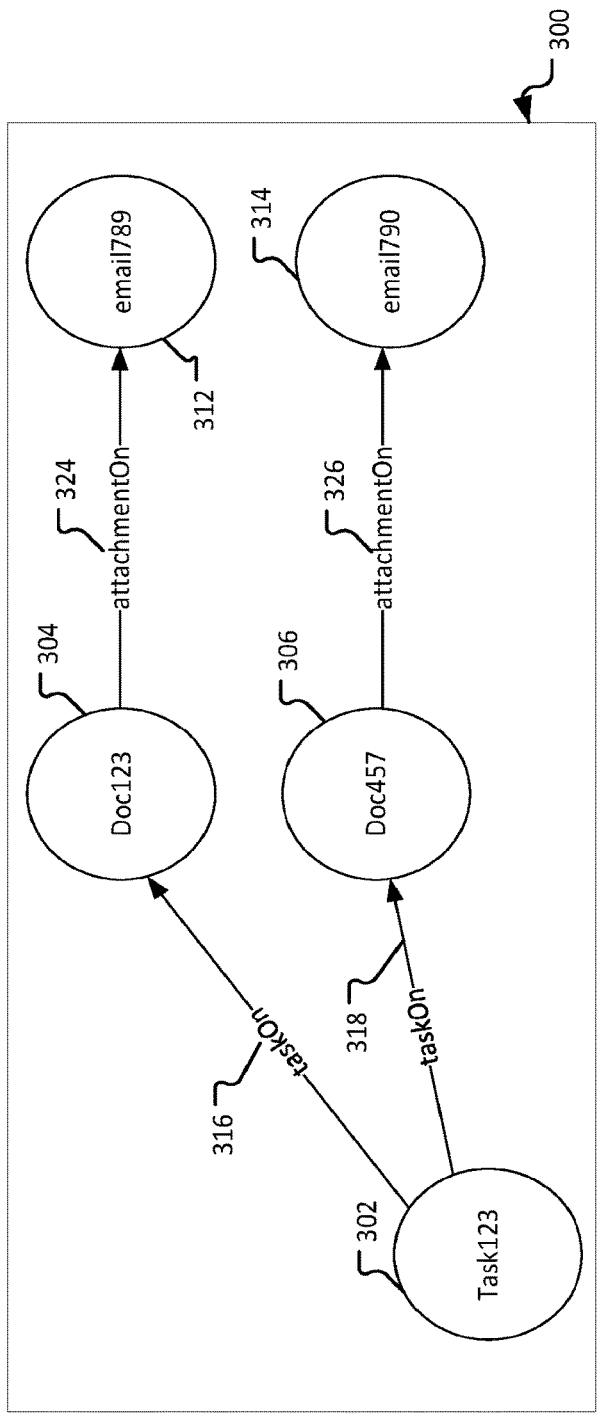
Figure 3E:
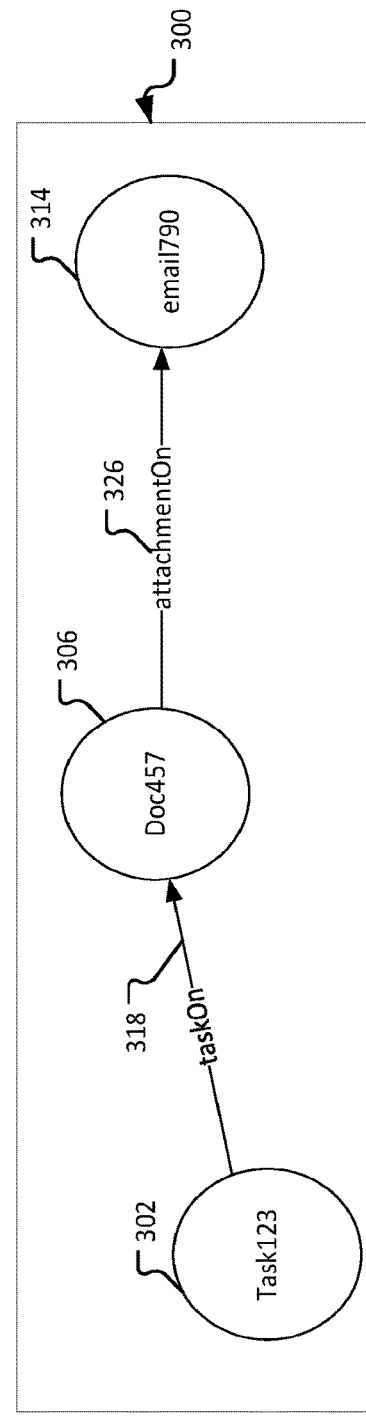

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300. For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http://.../collection300/task123' may be executed against collection 300. The query results may comprise resource identifier 302 and be visualized as illustrated in FIG. 3B. In FIG. 3C, the query has been amended to 'http://.../collection300/task123?$expand=taskOn' and executed against collection 300. The query results may comprise resource identifiers 302, 304, 306 and 308 and relationships 316, 318 and 320, and be visualized as illustrated in FIG. 3C. In FIG. 3D, the query has been amended to 'http://.../collection300/task123?$expand=taskOn ($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to 'http://.../collection300/task123?($expand=taskOn ($expand=attachmentOn)($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figures 4A, 4B:
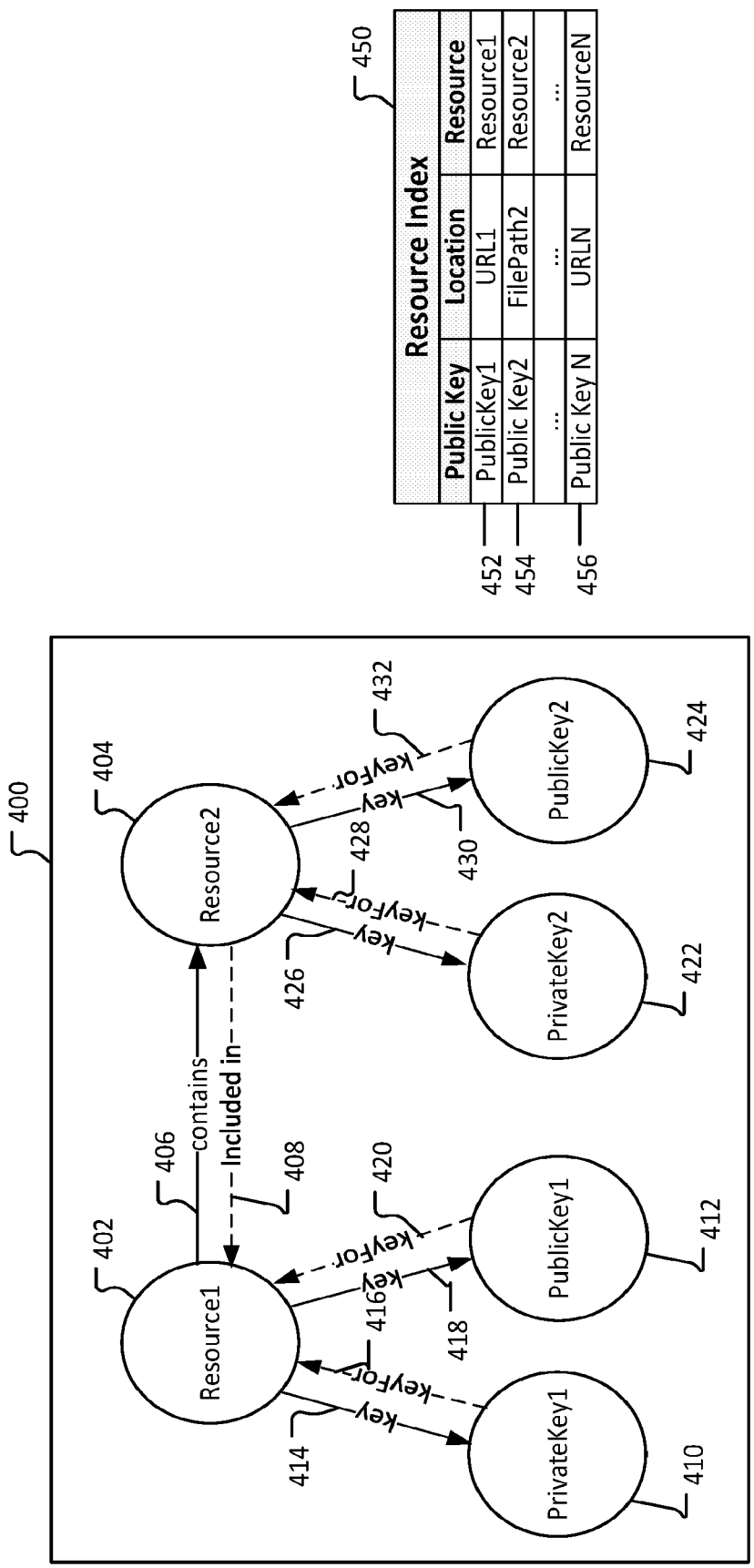
FIG. 4A illustrates an overview of an isolated collection using strong resource identification.
FIG. 4B illustrates an exemplary resource index 450

FIG. 4A illustrates an overview of an isolated collection 400 using strong resource identification. As depicted, isolated collection comprises two resources, Resource 1 402 and Resource2 404. While only two resource are depicted in isolated collection 400, one of skill in the art will appreciate that any number of resources may be included in an isolated collection. The resources depicted in FIG. 4 may be any type of resource such as an electronic document, a spreadsheet, an image, a video, an audio file, an application, a presentation, or any other type of data structure. Relationships 406 and 408 indicate that Resource1 408 contains Resource2 404. For example, Resource1 402 may be an email message that includes an attached document (e.g., Resource2 404). In another example, Resource1 402 may be an electronic document that includes a paragraph of text (e.g., Resource2 404). While specific types of resources and relationships have been described herein, one of skill in the art will appreciate that any type of resources may be employed with the aspects disclosed herein.

In order to provide a strong resource identity, cryptographic key pairs may be associated with each resource. PrivateKey1 410 and PublicKey1 412 may be associated with Resource1 402 by way of relationships 414-20. In some examples, PrivateKey1 410 and Public Key 412 may be key identifiers, wherein the actual cryptographic keys may be stored in a key vault or other data store (not pictured). PrivateKey1 410 and PublicKey1 412 may have been generated for Resource1 402 when the resource was first added to the isolated collection 400. In another example, PrivateKey1 410 and PublicKey1 412 may have been automatically generated at the time Resource1 402 was generated. Relationships 414 and 418 use solid arrows to indicate that asserted relationships of "key" exist between Resource1 402 and PrivateKey1 410, and Resource1 402 and PublicKey1 412, respectively. Relationships 414 and 418 are directional, in that they indicate that PrivateKey1 410 and PublicKey1 412 are both keys for Resource1 402, rather than the other way around. Similarly, relationships 416 and 420 use dashed arrows to indicate that inferred relationships of "keyFor" exist between PrivateKey1 410 and Resource1 402, and PublicKey1 412 and Resource1 402, respectively. Relationships 416 and 420 are directional, in that they indicate that PrivateKey1 410 is a key for Resource1 402 and that PublicKey1 412 is a key for Resource1 402, rather than the other way around.

Similarly, PrivateKey2 422 and PublicKey2 424 may be associated with Resource2 404 by way of relationships 426-32. In some examples, PrivateKey2 422 and PublicKey2 424 may be key identifiers, wherein the actual cryptographic keys may be stored in a key vault or other data store (not pictured). PrivateKey2 422 and PublicKey2 424 may have been generated for Resource2 404 when the resource was first added to the isolated collection 400. In another example, PrivateKey2 422 and PublicKey2 424 may have been automatically generated at the time Resource2 404 was generated. Relationships 426 and 430 use solid arrows to indicate that asserted relationships of "key" exist between Resource2 404 and PrivateKey2 422, and Resource2 404 and PublicKey2 424, respectively. Relationships 426 and 430 are directional, in that they indicate that PrivateKey2 422 and PublicKey2 424 are both keys for Resource2 404, rather than the other way around. Similarly, relationships 428 and 432 use dashed arrows to indicate that inferred relationships of "keyFor" exist between PrivateKey2 422 and Resource2 404, and PublicKey2 424 and Resource2 404, respectively. Relationships 428 and 432 are directional, in that they indicate that PrivateKey2 422 is a key for Resource2 404 and that PublicKey2 424 is a key for Resource2 404, rather than the other way around.

While the isolated collection 400 illustrates the relationship between the resources and their cryptographic key pairs, in certain aspects a public key may be tightly coupled with the resource as its identifier. That is, in examples a resource's public key may be included as part of the resource itself or in metadata associated with the resource. As previously described, the public keys associated with a resource may be used to share the resource. For example, in order to share Resource1 402 with other devices, PublicKey1 412 may be provided to the other device. In order to access Resource1 402, a requesting device may submit PublicKey1 412 to a host device of Resource1 402. Similarly, Resource2 404 may be shared by providing PublicKey2 424 with one or more devices or applications. As such, in examples, the only information needed by a device to request Resource1 402 is PublicKey1 412 and the only information needed to request Resource2 404 is PublicKey2 424.

As previously discussed, the public key for a resource is immutable. That is, changes to the resource, such as changes to the resource's name, or movement of the resource from one location to another, does not affect the public key associated with the resource. As such, a public key associated with a resource that was shared prior to changes to the resource is still operable to request the resource using a resource index. FIG. 4B illustrates an exemplary resource index 450. The resource index 450 may be a table or other data structure that stores information about resources. For example, the resource index may store information about the resource's location, name, or any other type of information relevant to the retrieval of a resource. In aspects, resource index 450 may be keyed based upon the resource's public keys. That is, a public key may be used to retrieve information about the resource stored in the resource index 450.

As illustrated in FIG. 4B, resource index 450 comprises a number of entries. Entry 452 relates to Resource1 and is indexed using PublicKey1, that is, PublicKey1 may be used to look up entry 452. Entry 452 contains information about the location of Resource1. Specifically, in the depicted example Resource 1 is located at URL1. Other resource entries, such as resource entry 454 and 456 may also contain information about the actual location (e.g., the storage location or other retrieval or access information for the resource) of their associated resources, which FilePath2 and URLN, respectively. Any changes to the resource, such as changes to the resource name or location, may be captured in the resource index 450. Thus, if a resource is changed subsequent to the sharing of the resource's associated key, the new information for the resource may be accessed using the public key, thereby allowing a requestor to access the resource even if the resource has been moved between the time that the requestor received the resource's public key and the time that a request is sent for the resource. Among other benefits, the use of index table 450 provides a solution to broken links or incorrect file paths that commonly occur when requesting a resource using conventional identifiers.

Figure 5:
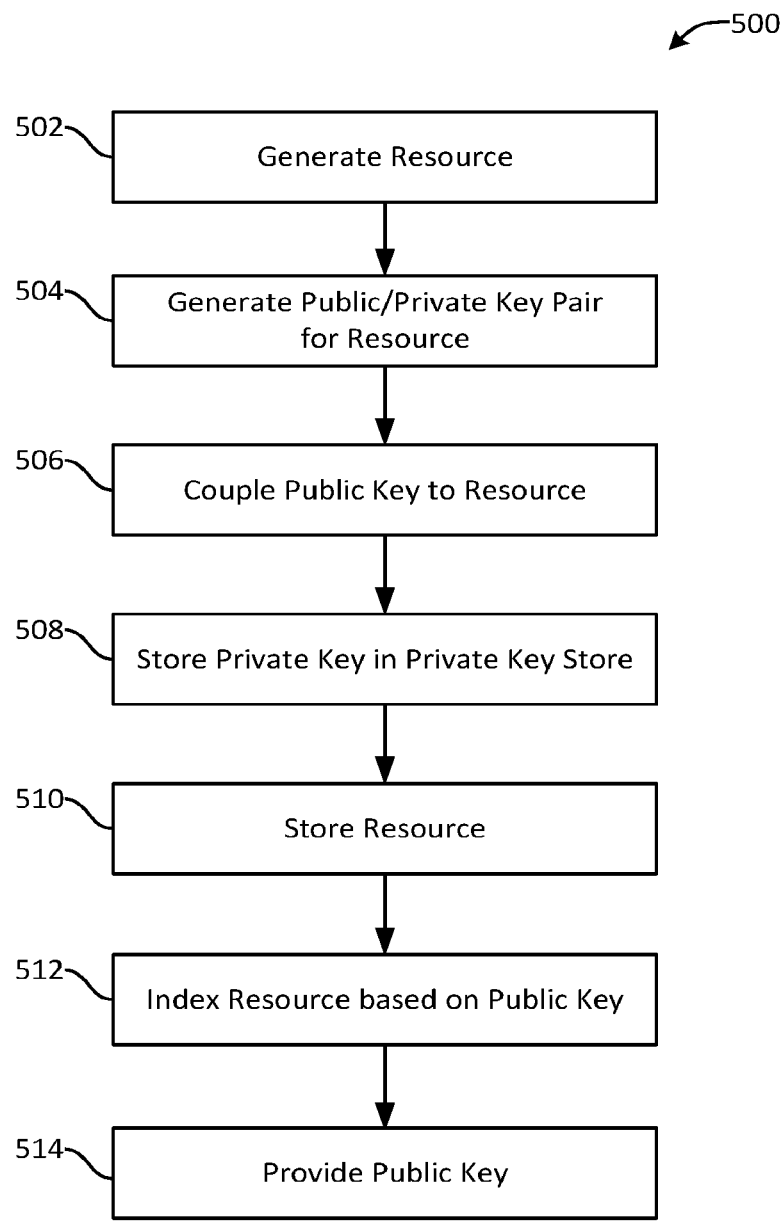
FIG. 5 illustrates an overview of an example method for indexing a resource using a public key.

FIG. 5 illustrates an overview of an example method 500 for indexing a resource using a public key. The method 500 may be performed by a device that creates a resource. As an example, the method 500 may be performed by a server operable to create and store resources. Alternatively, the method 500 may be performed by a local device upon the creation of a resource. For example, the method 500 may be performed by a client device when a new document is created by a word processing application resident on the client device. Method 500 begins at operation 502 where a resource is created. A resource may be created in response to receiving a request to create the resource. The request may be submitted by a user or by an application or process. The type of resource created at operation 502 may vary depending on the type of application or process that created or requested the resource. Exemplary types of resources include, but are not limited to, documents, spreadsheets, presentations, videos, images, applications, web pages, audio files, and the like. One of skill in the art will appreciate that the resource created at operation 502 may be any type of data structure.

Flow continues to operation 504 where a cryptographic key pair (e.g., a public and private key) may be generated for the resource. In examples, a unique key pair is created for the resource such that no other resource contains a similar key pair. In other example, the key pair created for the resource may be unique to the resource's domain. That is, a similar key pair may be used for other resources so long as the other resources are not in the same domain as the resource created at operation 502. A cryptographic key may be a symmetric key or an asymmetric key pair comprised of a public key and a private key, among other key types. In one example, the public key may be used for encryption and signature verification, while the private key may be used for decryption and signature generation. In another example, the private key may be stored at a location or with access controls other than that of the public key, such that the private key is less widely-available than the public key. A variety of cryptographic algorithms may be used, including, but not limited to, Advanced Encryption Standard (AES), Digital Signature Algorithm (DSA), Rivest-Shamir-Adleman (RSA), and Elliptic Curve Cryptography (ECC), among others, or any combination thereof. The cryptographic key may have similar or different properties as compared to other cryptographic keys. As an example, each key may have similar or different key lengths or may use similar or different cryptographic algorithms, as well as other similar or different attributes that may be unique to a specific cryptographic algorithm. One of skill in the art will appreciate that other cryptographic algorithms, key types, or systems may be used without departing from the spirit of this disclosure so long as a unique cryptographic key pair is created for each resource associated with a particular domain.

Flow continues to operation 506 where a public key of the cryptographic key pair is associated with the resource. In one example, the public key may be tightly coupled with the resource. For example, the public key may be included in the resource itself. Including the public key in the resource may comprise adding a value of the public key to the resource. Alternatively, the public key may be added to metadata associated with the resource. Alternatively, a key log may be implemented that associates the public key with the resource. Association of the public key with the resource results in the creation of a strong identity for the resource. That is, upon associating the public key with the resource the resource may be uniquely identified by the public key regardless changes to the resource's name, features, and/or location.

Flow continues to operation 508 where the resource's public key is stored. In one example, the resource's private key may be stored in a key vault associated with the device or system performing the method 500. Alternatively, or additionally, the resource's private key may be provided to the resource's owner and/or stored in a key vault associated with the resource's owner. In some examples, the private key associated with the resource may be access-restricted such that only the resource owner may access the private key. In aspects, the private key may not be used as an identifier for the resource. However, the private key may be maintained for other purposes, such as for decryption and/or signature generation. As an example, a resource may be automatically or manually signed using the resources private key such that other entities accessing the resource may automatically or manually verify the cryptographic signature using the resource's public key to verify the authenticity of the resource. This feature is not available using conventional identifiers.

At operation 510, the resource is stored. In one example, the resource may be stored in a resource host, such as a database or a server that is accessible via a network. Alternatively, or additionally, the resource may be stored on a local device. Upon storing the resource, flow continues to operation 512 where the resource is indexed using the public key. As noted above, associating the public key with the resource provides a uniquely strong identifier for the resource. Additionally, the characteristics of a public key lend particularly well to indexing. As such, an efficient index of resources may be created using the resource's public key. In examples, the index may include information about the resource such as the value of the resource's public key, the location that the resource is stored at (e.g., a URL, a file path, etc.), the resources name, and/or other information about the resource. Upon indexing the resource, the public for the resource may be provided at operation 514. In one example, providing the public key may comprise sending the public key to the resource owner. This allows the resource owner to share the resource with other entities by providing a copy of the public key. Alternatively, or additionally, providing the public key may comprise publishing the public key in an enterprise system or publicly via the Internet. When the public key is openly published, it may be accessed an indexed by a search engine. Under such circumstances, the resource may be discovered using a search engine. As such, if the resource is a web page, publication of the public key provides the ability for the resource to be accessed via online search engines. As such, in addition to providing strong resource identities, the aspects disclosed herein may be utilized for the discovery of resources over a network, such as the Internet. For example, rather than a DNS server, a public key index may be used to discover web pages and other resources via the Internet.

Among other benefits, discovery of the resource is greatly enhanced via the pubic key association as opposed to conventional resource identity systems. In prior systems, resources are identified by name, e.g., "Document1," or location, e.g., "\user\Desktop\Document1." In such systems, acquiring the correct resource may be difficult due to multiple resources having the same name or moving the resource from one location to another. However, the strong identity methods and systems of the present disclosure solve such discovery issues by ensuring that every resource has a unique name due to the uniqueness of each pubic key. Furthermore, the indexing described herein allows a system to automatically track resources upon movement of the resource from one directory to another. As such, the requestor need not know the name of the resource or the location that where the resource is stored. Rather, all that is needed to discover the resource is the resource's public key.

Figure 6:
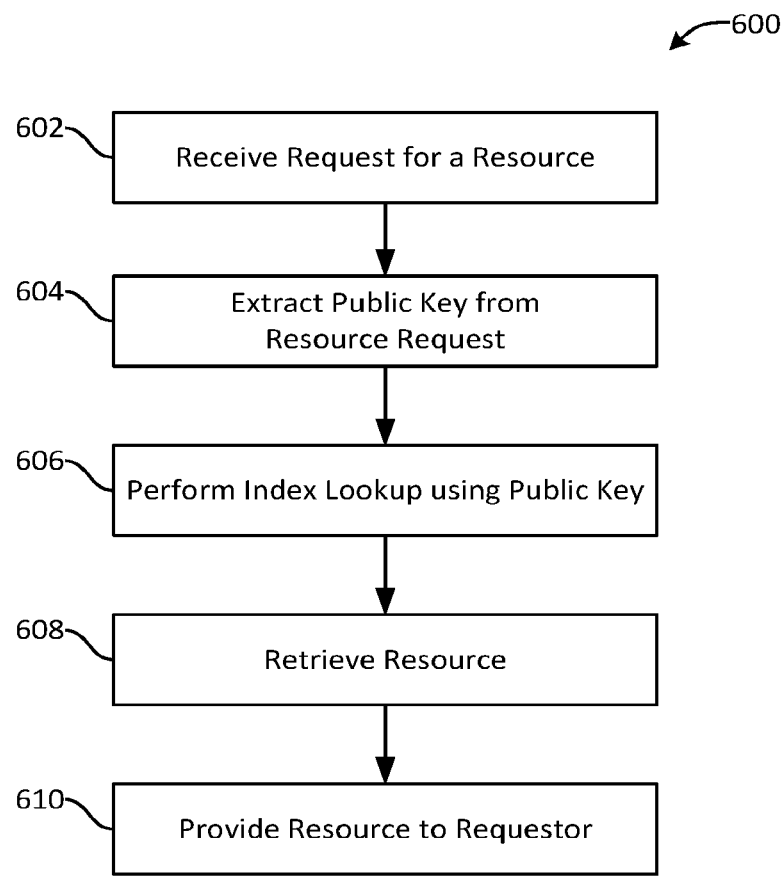
FIG. 6 illustrates an overview of an example method for retrieving a resource using a public key.

FIG. 6 illustrates an overview of an example method 600 for retrieving a resource using a public key. The method 600 may be performed by a device that hosts a resource. As an example, the method 600 may be performed by a server operable to host resources on a network. Alternatively, or additionally, the method 600 may be performed by a local client to retrieve a locally stored resource in response to a request to access the resource from a user or an application. The method 600 begins at operation 602 where a request for a particular resource is received. In one example, the request may be received from a remote device attempting to access a resource stored on the device performing a method. In an alternate example, the request may be received via a process or application residing on the device performing the method 600. In examples, the request comprises a public key associated with the resource. Other information about the resource may be included in the request; however, in most instances the public key may be sufficient to identify the resource. Alternatively, if device performing the method 600 comprises multiple domains in which public keys are reused, the request may also include information about which domain the resource belongs to.

Flow continues to operation 604 where a resource's public key is retrieved from the request. As noted above, if the device performing the method hosts multiple domains, a domain associated with the resource may also be retrieved from the request. The retrieved domain information may be used to identify the proper public key index to search for the resource. Domain information may be included in the request, may be included in metadata associated with the public key, or may be included in the public key itself.

At operation 606, an index lookup is performed using the public key from the request. As previously noted, discovery information (e.g., information identifying a resource's location such as a URL, a file path, and the like), may be indexed using the resource's public key. At operation 608, the information is retrieved using discovery information stored in the index. The resource may then be provided to the requestor at operation 610. In one example, the actual resource is provided to the requestor at operation 610. Alternatively, information about the storage location of the resource may be provided to the requestor at operation 610. The requestor may then use that information to retrieve the resource.

Because the public key is immutable, any changes to the resource, such as changes to the resources name and/or storage location, does not change the public key. As such, a public key distributed to one or more devices before a change to the resource occurs is may still be used to discover and/or access the resource after a change is made. This is not possible using conventional methods, such as a URL. If a resource associated with the URL is changed after the URL has been distributed, a requestor will no longer be able to access the resource using a URL. As such, conventional methods require an updated URL to be provided to the requestor before the requestor can access the resource. However, the present disclosure provides that any changes to the resource are updated and reflected a public key index table. As such, the resource's public key is operable to discover and access the resource regardless of any changes made after the public key was distributed.

Figure 7:
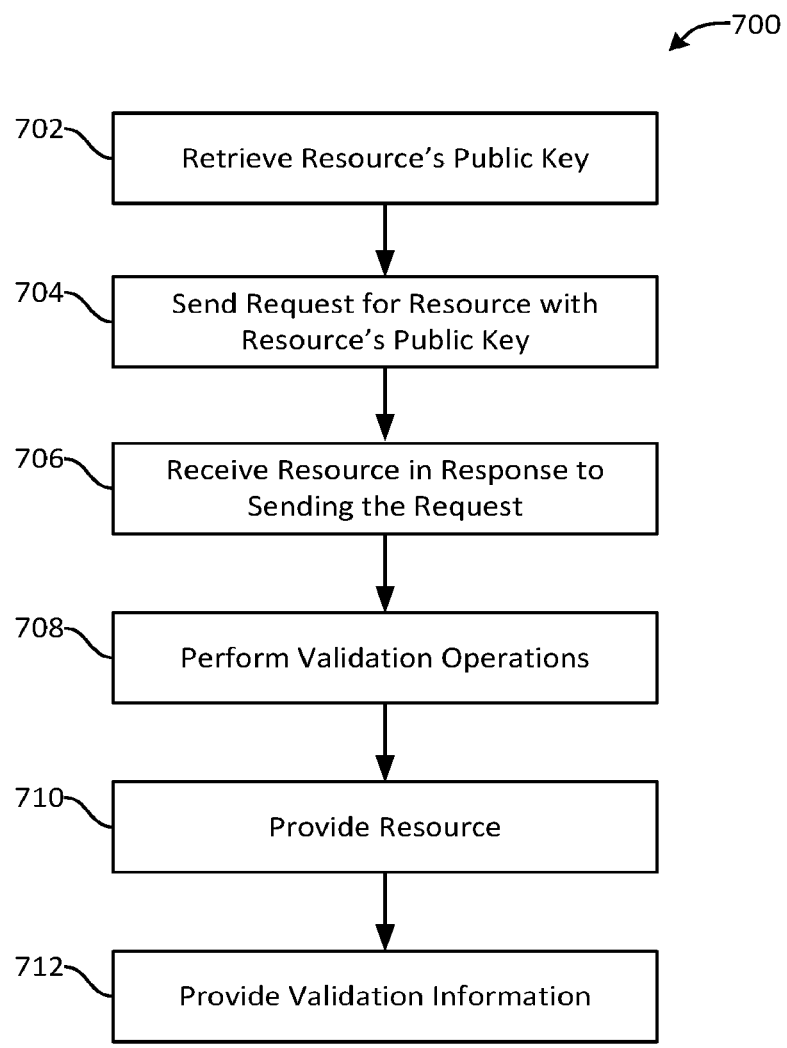
FIG. 7 illustrates an overview of an example method for requesting a resource using a public key.

FIG. 7 illustrates an overview of an example method 700 for requesting a resource using a public key. Flow begins at operation 702 where a public key for a resource is retrieved. In one example, a public key for the resource may be retrieved from a public key vault that stores the public keys of all resources shared with a particular device or user. Alternatively, a public key may be distributed via a message or other means. For example, a resource's public key may be distributed as an attachment to an email message. In such an example, the public key may be retrieved from the email message. For example, a user may select a public key attached to the message in order to retrieve the underlying resource. In still further examples, the public key may be retrieved via a request sent to a remote device or application.

Flow continues to operation 704 where a request for the resource comprising the public key is sent. The request may be sent to a device hosting the resource, a search engine, a file browser, an application marketplace, an application (e.g., a word processing application, a spreadsheet application, a browser, etc.) or any other entity that stores or otherwise owns the resource. In one example, in order to send the request to the proper entity, operation 704 may further comprise determining information about the requested resource such as the type of resource, the resource's domain, or any other type of disambiguating information. For example, a determination may be made that the resource is an electronic document. In such examples, the request may be sent to a word processing application. Alternatively, the resource may be a webpage or an application, in which case the request may be sent to a browser or an application marketplace, respectively. Domain information may also be determined in order to ensure that the request is sent to the correct domain or that the request contains the proper information such that a device receiving the request uses the right index to find the resource. In response to sending the request, flow continues to operation 706 where the resource is received at or otherwise accessed by the requesting device or application.

As previously noted, the aspects disclosed herein related to strong resource identification using public keys may provide additional capabilities that are not available in conventional resource identification systems. As such, in examples, upon receiving the resource the resource may be validated at optional operation 708. As previously noted, a private key associated with the resource may be used to sign the resource. As such, upon receiving the resource, the public key may also be used to validate the resource to ensure that the resource received in response to sending the request is indeed the resource that was requested. As such, the strong identity systems and methods disclosed herein provide additional security that may be used to prevent malicious man-in-the-middle attacks, homograph attacks, phishing attacks, and/or the receipt of a malicious resource or file.

The cryptographic keys employed by the aspects disclosed herein may also be used to generate digital certificates to authenticate a resource and/or its owner. For example, an X.509 compliant certificate may be generated using the public keys associated with a resource. The X.509 certificate may be used to verify an owner or creator of the resource. Additionally, certificate revocation lists may be utilized so that owners of a resource may later disclaim ownership or validity of the resource. For example, when the resource is an application, the application owner may revoke the certificate upon creation of a new version of the application, upon discovery of errors within the application, etc. As such, users who obtain a copy of the old application may be informed that a new application is available or that the application is buggy by checking a certificate revocation list. In another example, if the resource is a document, the documents author may revoke the resource's certificate in cases where the author no longer supports the content of the document. These additional features are not available using conventional resource identifiers.

Upon performing validation operations such as, for example, validating a digital signature and evaluating a resource's certificate, flow continues to operation 710 where the resource is provided to the requestor. Providing the resource may include displaying the resource, or information about the resource, consuming the resource using an application (e.g., opening an electronic document using a word processing application), storing a copy of the resource locally at the requesting device, etc. At operation 712, validation information about the resource may also be provided. For example, indications may be provided that a signature or certificate associated with the resource is valid or invalid.

Figure 8:
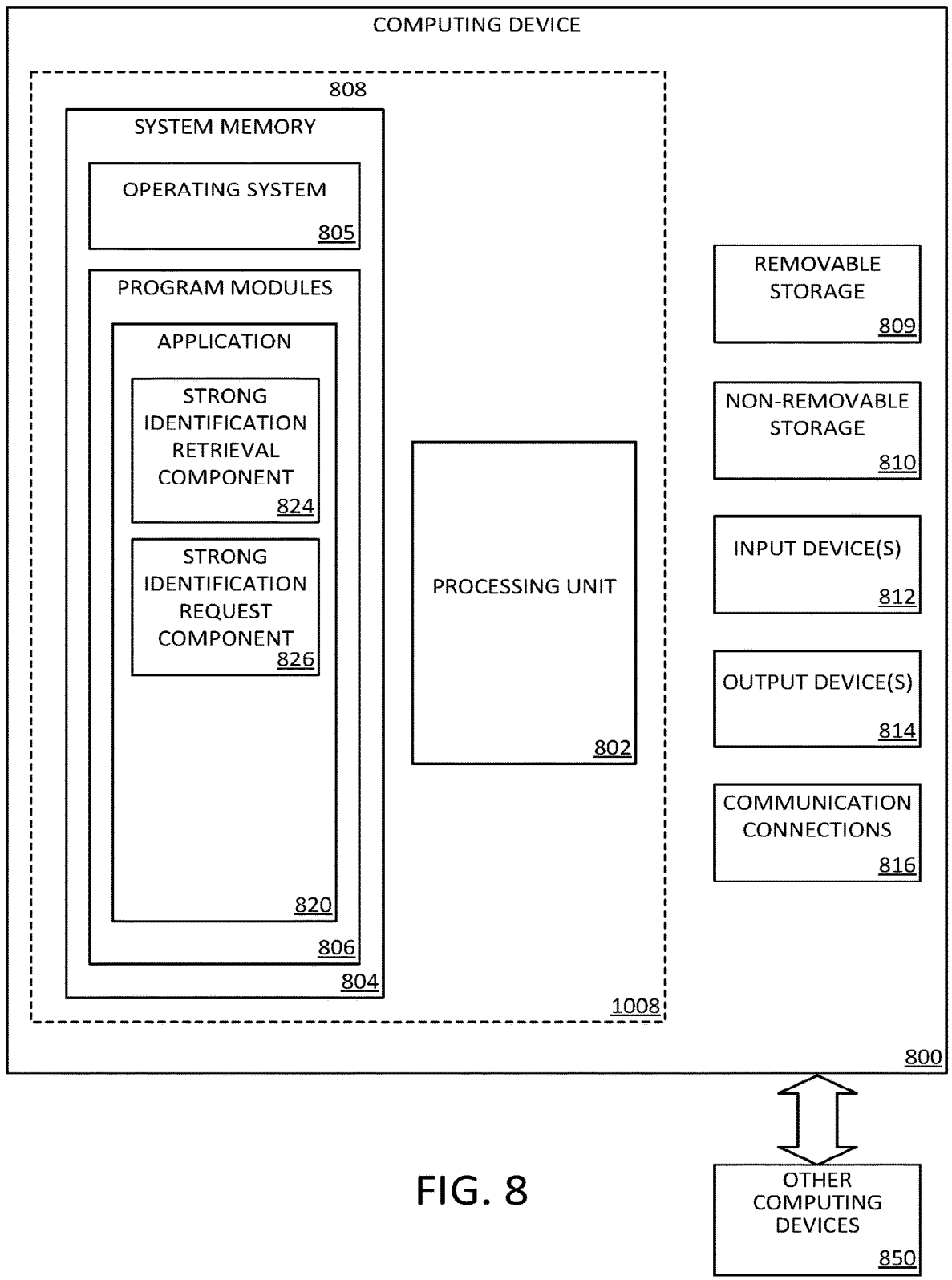
FIG. 8 is a block diagram illustrating example physical components of a computing device with which aspects of the disclosure may be practiced.

FIGS. 8-110 and the associated descriptions provide a discussion of a variety of operating environments in which aspects of the disclosure may be practiced. However, the devices and systems illustrated and discussed with respect to FIGS. 8-10 are for purposes of example and illustration and are not limiting of a vast number of computing device configurations that may be utilized for practicing aspects of the disclosure, described herein.

FIG. 8 is a block diagram illustrating physical components (e.g., hardware) of a computing device 800 with which aspects of the disclosure may be practiced. The computing device components described below may be suitable for the computing devices described above, including the client computing devices 82A-C and the server computing devices 86A-C. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for performing the various aspects disclosed herein such as a strong identification retrieval component 824 and strong identification request component 826. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
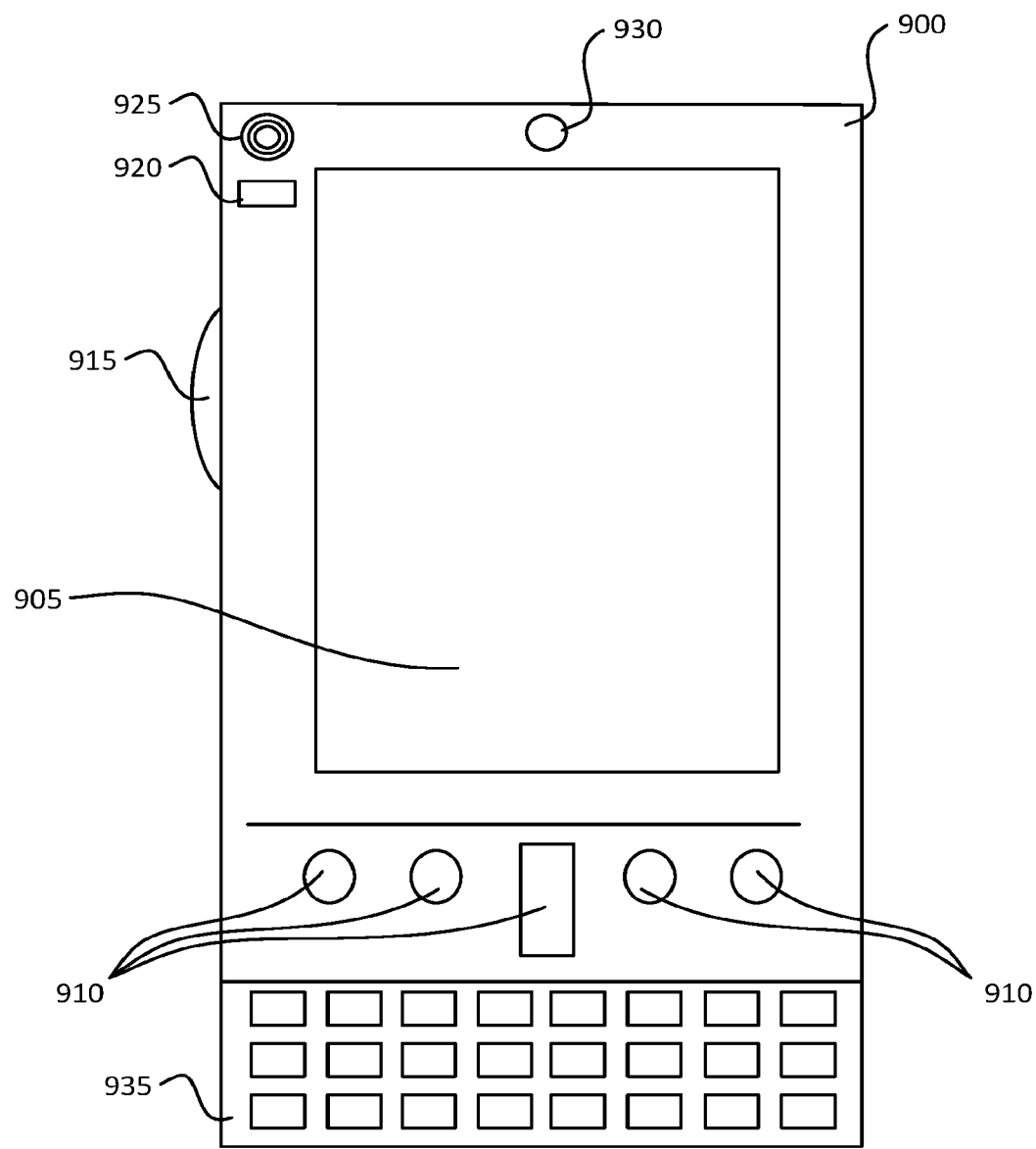
FIGS. 9A and 9B are simplified block diagrams of a mobile computing device with which aspects of the present disclosure may be practiced.
Figure 9B:
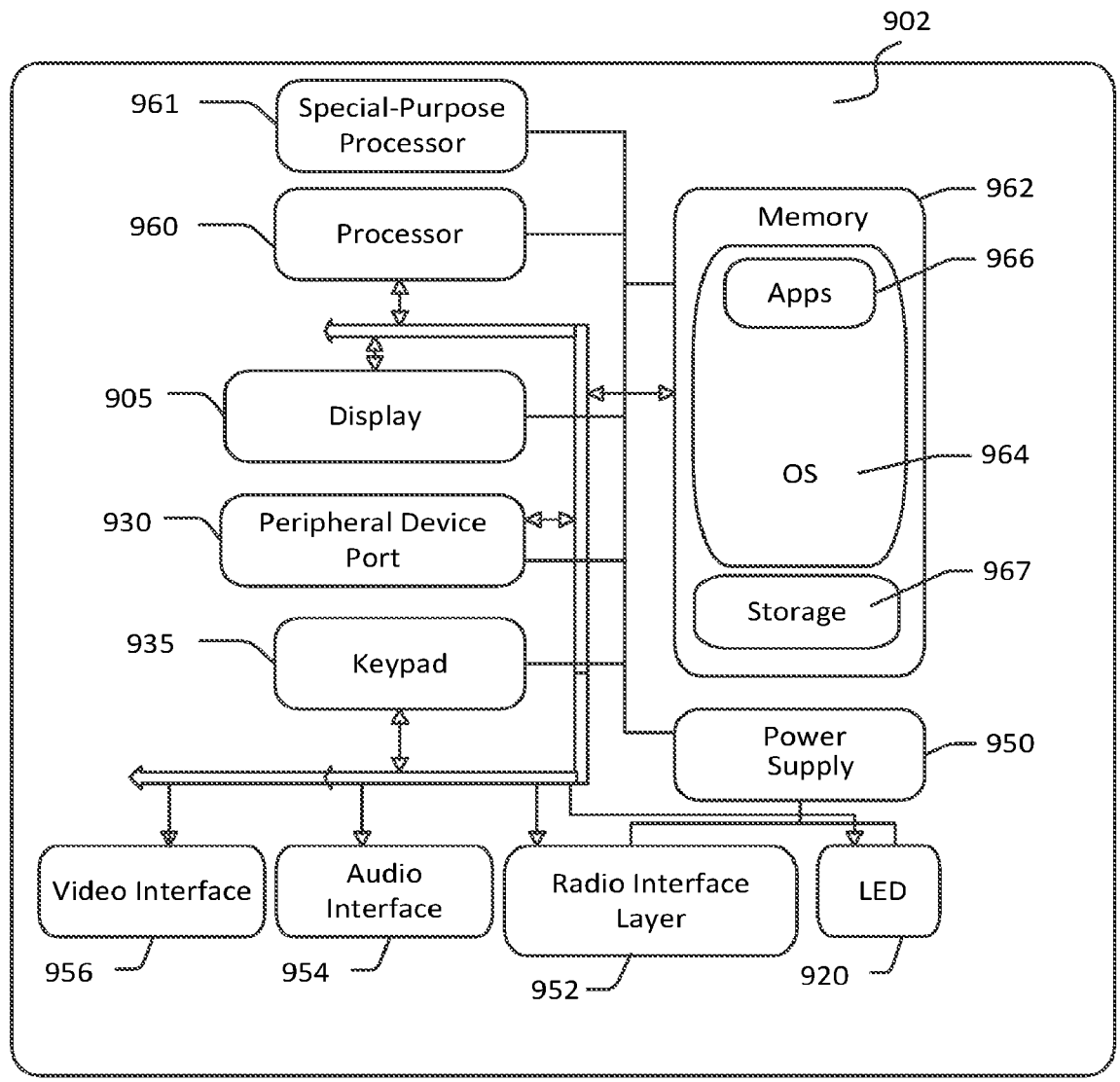
Figure 10:
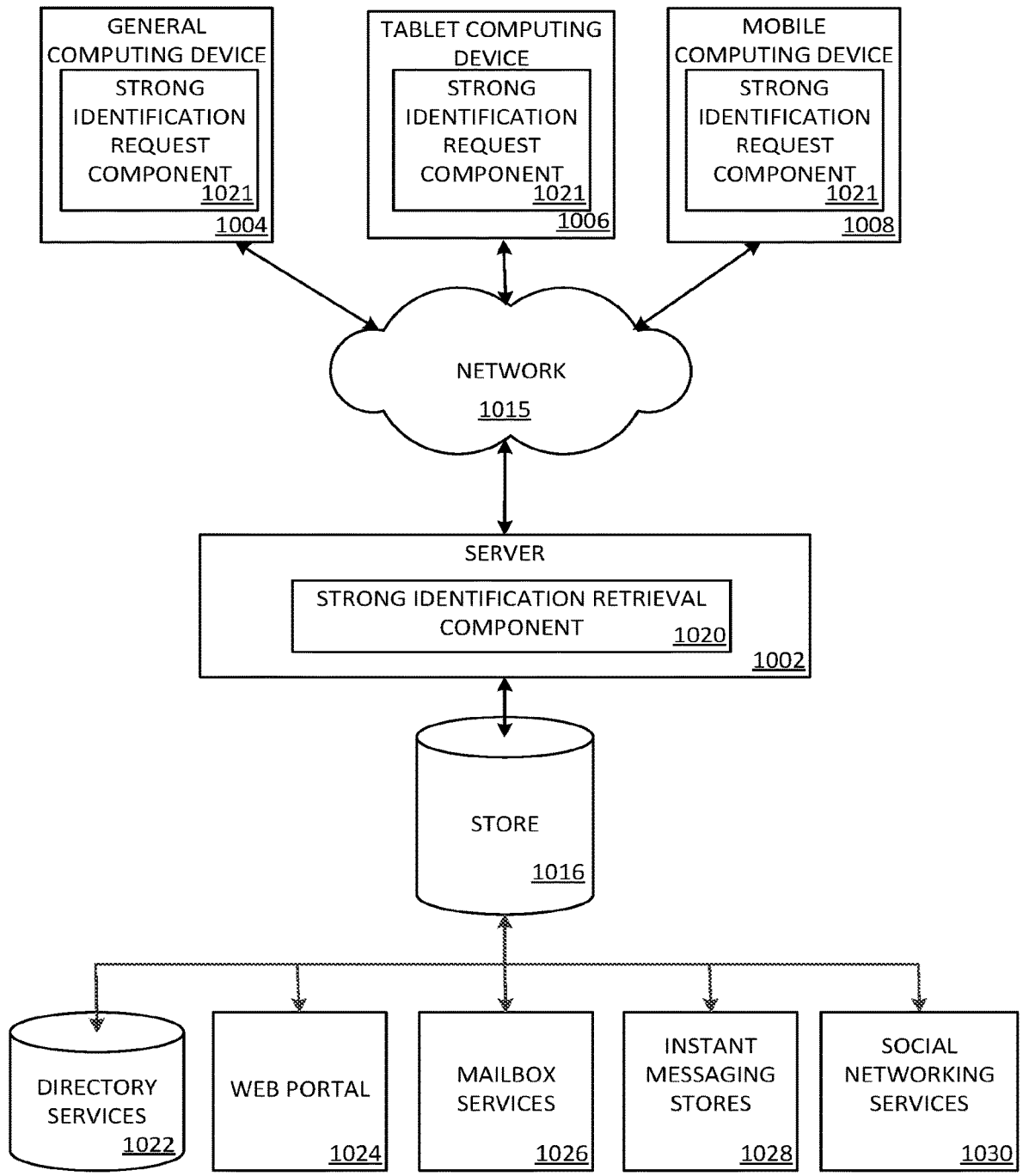
FIG. 10 is a simplified block diagram of a distributed computing system in which aspects of the present disclosure may be practiced.

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Strong identification request component 1021 may be employed by a client that communicates with server device 1002, and/or Strong identification retrieval component 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Figure 11:
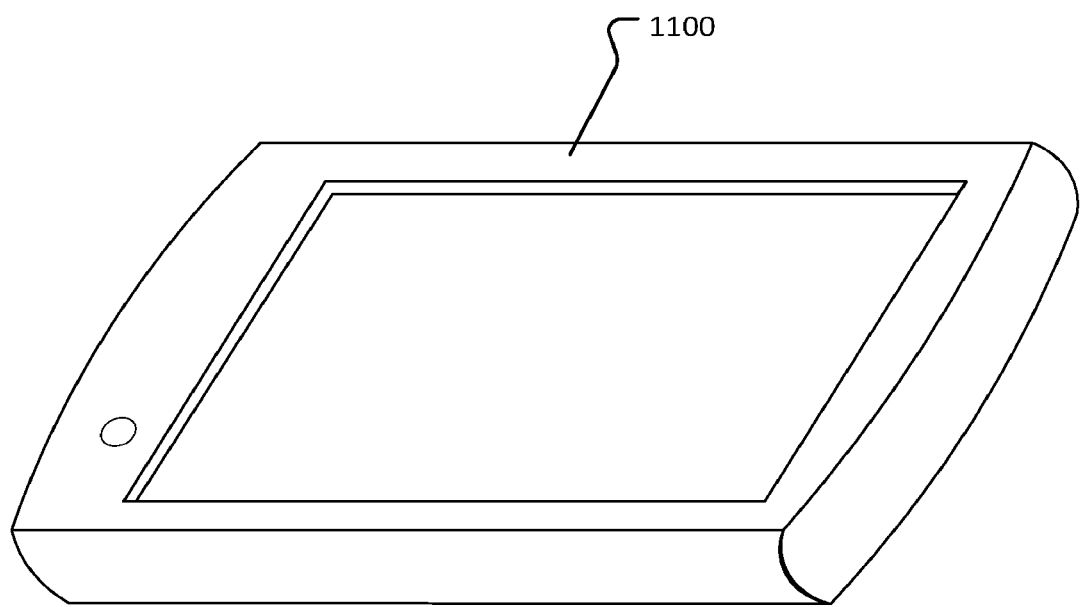
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a method comprising: generating a resource; generating a cryptographic key pair; associating a public key from the cryptographic key pair with the resource; storing the resource; and adding information about the resource to a resource index, wherein the resource is indexed by the public key associated with the resource. In a further example, the information about the resource comprises information identifying an actual location of the resource. In a further example, the method further comprises storing a private key from the cryptographic key pair in at least one of a private store and a key vault. In a further example, associating the public key with the resource comprises adding the public key to the resource. In a further example, associating the public key with the resource comprises adding information about the public key to metadata associated with the resource. In a further example, the resource comprises at least one of: a document; a web page; a spreadsheet; a presentation; and an application. In further examples, the method further comprises providing the public key, wherein providing the public key comprises at least one of: sending the public key to a requestor device; and publishing the public key.

Another exemplary aspect of the present disclosure relates to a system comprising: at least one processor; and a memory storing instructions that when executed by the at least one processor perform a method comprising: retrieving a public key associated with a resource; generating a request for the resource, wherein the request for the resource comprises the public key; sending the request for the resource to a resource host; and in response to sending the request, receiving the resource. In further examples, the method further comprises performing at least one validation operation on the resource. In further examples, the at least one validation operation comprises validating a digital signature of the resource using the public key. In further examples, the at least one validation operation comprises evaluating a least one of a certificate associated with the resource and a certificate revocation list. In further examples, the method further comprises providing validation information about the resource. In further examples, the method further comprises: retrieving domain information associated with the public key; and identifying the resource host using the domain information.

Another exemplary aspect of the present disclosure relates to a method comprising: generating a resource; generating a cryptographic key pair; associating a public key from the cryptographic key pair with the resource; storing the resource; and adding information about the resource to a resource index, wherein the resource is indexed by the public key associated with the resource. In example, the method further comprises sending the public key to a remote device. In examples, the method further comprises receiving a request for the resource from a requestor, wherein the request comprises the public key; accessing information about the resource from the resource index, wherein the information about the resource is accessed using the public key; and based at least upon the information about the resource, retrieving the resource; and providing the resource to the requestor. In examples, the method further comprises generating a certificate using the cryptographic key pair. In examples, the method further comprises generating a digital signature for the resource using the private key. In further examples, the method further comprises providing the public key, wherein providing the public key comprises at least one of: sending the public key to a requestor device; and publishing the public key. In further examples, the resource comprises at least one of: a document; a web page; a spreadsheet; a presentation; and an application.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, perform operations comprising:
   generating, by a client device, a resource;
   generating, by the client device, a cryptographic key pair;
   associating a public key from the cryptographic key pair with the resource;
   storing the resource on the client device;
   adding information about the resource to a resource index, wherein the resource is indexed by a value of the public key associated with the resource, such that the resource is discoverable using the value of the public key regardless of a change to the resource;
   receiving, at the client device, a request for the resource from a requestor, wherein the request comprises the public key;
   accessing information about the resource from the resource index, wherein the information about the resource is accessed using the public key; and
   based at least upon the accessed information about the resource, retrieving, by the client device, the resource; and
   providing the resource to the requestor.

2. The system of claim 1, wherein the information about the resource comprises information identifying an actual location of the resource.

3. The system of claim 1, wherein the operations further comprise storing a private key from the cryptographic key pair in at least one of a private store and a key vault.

4. The system of claim 1, wherein associating the public key with the resource comprises adding the public key to the resource.

5. The system of claim 1, wherein associating the public key with the resource comprises adding information about the public key to metadata associated with the resource.

6. The system of claim 1, wherein the resource comprises at least one of:
- a document;
- a web page;
- a spreadsheet;
- a presentation;
- a data structure;
- a file; and
- an application.

7. The system of claim 1, wherein the operations further comprise providing the public key, wherein providing the public key comprises at least one of:
- sending the public key to a requestor device; and
- publishing the public key.

8. A method comprising:
- generating, by a client device, a resource;
- generating, by the client device, a cryptographic key pair;
- associating a public key from the cryptographic key pair with the resource;
- storing the resource on the client device;
- adding information about the resource to a resource index, wherein the resource is indexed by a value of the public key associated with the resource, such that the resource is discoverable using the value of the public key regardless of a change to the resource,
- receiving, at the client device, a request for the resource from a requestor, wherein the request comprises the public key;
- accessing information about the resource from the resource index, wherein the information about the resource is accessed using the public key; and
- based at least upon the accessed information about the resource, retrieving, by the client device, the resource, and
- providing the resource to the requestor.

9. The method of claim 8, further comprising sending the public key to a remote device.

10. The method of claim 8, further comprising generating a certificate using the cryptographic key pair.

11. The method of claim 8, further comprising generating a digital signature for the resource using a private key.

12. The method of claim 11, further comprising providing the public key, wherein providing the public key comprises at least one of:
- sending the public key to a requestor device; and
- publishing the public key.

13. The method of claim 8, wherein the resource comprises at least one of:
- a document;
- a web page;
- a spreadsheet;
- a presentation; and
- an application.

* * * * *